Patented Sept. 12, 1944

2,357,866

UNITED STATES PATENT OFFICE 2,357,866

REFINING OIL-SOLUBLE SULPHONATES

Francis M. Archibald, Elizabeth, and Dick van Dijk, Roselle, N. J., assignors to Standard Oil Development Company, a corporation of Delaware No Drawing. Application May 29, 1941, Serial No. 395,738

13 Claims. (Cl. 260—504)

This invention relates to the refining of oil-soluble sulphonates recoverable from the reaction of intensively treating petroleum oil with sulphuric acid and the products obtained thereby. The invention relates more particularly to a purification procedure for oil-soluble sulphonates which insures the preparation of products of good color and odor.

When petroleum fractions are intensively treated with sulphuric acid, sulphated, sulphonated and oxidized derivatives of the hydrocarbons are produced. The character of these products varies with the intensity of the treatment. The treatment of the distillates of lower boiling range, especially of cracked distillates to remove therefrom the chemically more reactive unsaturates and to improve color produces mainly chemically unstable sulphur and oxygen containing hydrocarbon derivatives which are usually discarded as waste materials. Under more intensive treatment of the distillates, especially those of the higher boiling range, with sulphuric acid such as in the preparation of medicinal white oils, the sulpho-compounds produced are valuable by-products and industrially important.

The sulphonic acids produced by the intensive treatment are of two distinct types, namely, the essentially water-soluble compounds occurring mainly in the acid sludge phase and associated with the sulphated compounds, and the essentially oil-soluble compounds occurring almost exclusively in the oil phase. These sulphonic acids are aptly termed the green acids and mahogany acids respectively because of the colors they impart to the respective solutions. The green acids produced from a particular oil are obtained usually in amounts from 10% to 60% by volume of the oil and are mixtures of acids ranging in molecular weight from about 150 to 1,000 and of empirical formulae varying from $C_nH_{2n-6}SO_4$ to $C_nH_{2n-9}SO_4$. The mahogany acids produced from a particular oil on the other hand, are obtained usually in amounts between 1% and 8% by volume of the oil and are definite chemical entities to which the empirical formula $C_nH_{2n-12}SO_3$ has been given. It is with the preparation of highly stable derivatives of the oil-soluble or mahogany acids that this invention is concerned.

The preparation of oil-soluble sulphonates is largely a by-product industry in the preparation of mineral white oils. In preparing the mineral white oils a virgin petroleum distillate usually of about lubricating oil consistency is intensively treated with a strong mineral acid, usually sulphuric acid, in order to remove chemically unstable and chromophoric compounds. This treatment involves intimate contact of the oil with 20% to 55% by volume of acid of at least 96% strength up to 30% fuming strength at temperatures between about 20° C. and 75° C. In such treatment of petroleum oils with sulphuric acid, appreciable sulphonation occurs in which the two types of compounds are formed, namely the oil-soluble sulphonates or mahogany acids and the water-soluble sulphonates or green acids. Of these acidic compounds the derivatives of the oil-soluble sulphonic acids are commercially more important than those of the green acids because the derivatives of the mahogany acids, especially the sodium salts, when suitably refined, are used as emulsifiers in the preparation of oil in water emulsions and as constituents in textile lubricants.

The injurious effects of impure sulphonates have been found to vary with the color of the compounds. The color of sulphonates is largely determined by the manner in which the acid treating has been effected and partly by the methods employed in the refining of the sulphonates. Many of the compounds which cause the coloration are unstable sulphated and sulphonated hydrocarbons which are formed by the reaction of the acid on the oil at the higher treating temperatures and are associated with the oil-soluble sulphonates as a result of an incomplete separation of the acid sludge from the oil phase. Worthy of note here is that such type impurities are removed from the more stable sulphated and water-soluble sulphonates obtained by treating cracked distillates at low temperatures with sulphuric acid by the process disclosed in Patent 2,092,943. In the case of the oil soluble sulphonates produced by treating straight-run distillates intensively with sulphuric acid at temperatures up to about 75° C. deterioration and detraction in quality are due considerably to the presence, as impurities, of inorganic salts and water and it is only by careful refining by processes such as that disclosed in Patent 2,214,037 that these impurities can be substantially removed. In some respects, the present invention may be considered an improved refining procedure over that disclosed in Patent 2,214,037. The effects of the difficultly removable traces of the inorganic impurities are either eliminated or inhibited by the process of this invention. The method affords a means, therefore, of preparing highly refined stable oil-soluble sulphonates with commercial advantage.

Crude oil-soluble sulphonates as recovered from a petroleum oil intensively treated with sulphuric acid at normal or slightly higher temperatures and its subsequent neutralization, contain sodium sulphate, sodium sulphite, excess alkali, iron salts when iron equipment is used in their preparation, and appreciable quantities of water. Purification usually consists in separating first the inorganic salts and then dehydrating the resultant mixture. In drying the product, oil is sometimes added in order to render the mass more fluid and the purified sulphonates supplied to industry in the oil solution. It is desired that the thus suitably refined product be clear per se or in oil solution give clear transparent solutions. The dehydration of the sulphonates, however, is ordinarily accompanied by substantial color degradation due to their thermal instability, which is particularly evident in the presence of iron. This occurs largely as the result of heating to between 130° and 160° C. in order to remove effectively water in the presence of oil. At these temperatures the sulphonate tends to decompose and liberate acidity which autocatalytically induces further breakdown. This effect is particularly marked in the presence of iron and steel. Usually the iron occurs in the sulphonate material as complex sulpho-iron compounds, which are of dark color and impart that coloration to the mass and also cause undesirable staining in contact with textile materials.

In the purification procedures commonly employed there is evident a certain correlation between color and the capacity of the oil-soluble sulphonates to form stable oil in water emulsions. Indeed, the capacity of oil-soluble sulphonates to form stable emulsions is often indicated by the color of the sulphonate material. It is required for sales purposes, also, that the preparation of highly colored products be avoided. Furthermore decomposition of the sulphonates to an appreciable extent effects a change in viscosity of the material and produces an undesirable odor. Moisture and excess alkali in small amounts inhibits this deterioration when the decomposition yields a strong acid. Since the preparation of sulphonates is generally a by-product in the preparation of mineral white oils and since the commercial outlets for highly purified sulphonates are limited, the equipment in which the refining of the sulphonates is effected is usually in the less expensive type, i. e., essentially iron equipment, although the more expensive nickel-bearing and KA2S type of equipment is known to be preferable. The present invention is of special value in providing a method for the refining of oil-soluble sulphonates in iron type equipment to overcome the disadvantages of refining in that way, but it is also applicable to the refining of oil-soluble sulphonates in any type of equipment.

An improved purification procedure in the refining of oil-soluble sulphonates has now been found by which the decomposition in the final stages of purification is eliminated. The method consists in dissolving the crude sulphonates in a suitable solvent such as aqueous isopropyl alcohol solution of not less than 60% alcohol, separating the insoluble inorganic salts, distilling off the solvent then adding a small amount of an oil-soluble base having a dissociation constant above $3.5 \times 10^{-10}$ and heating the resultant solution to remove substantially all the solvent liquid. It has been found that aniline which has a dissociation constant of $3.5 \times 10^{-10}$ and organic bases having dissociation constants below this value are ineffective in the process. Particularly desirable compounds are the oil-soluble bases especially the alkanolamines having dissociation constants above $3.5 \times 10^{-10}$ which have boiling points above about 150° C. The procedure is particularly effective in the processing of the unstable soaps produced from a straight-run gas-oil of 50 Saybolt viscosity (at 100° F.) by treating at 45° C. with 50% of its volume with 20% fuming sulphuric acid. The method is to have associated with the oil-soluble sulphonate during its dehydration a base material which is sufficiently active to prevent the decomposition of the sulphonate material during its dehydration. The procedure is applicable, therefore, as a step in the preparation of substantially dry, purified oil-soluble sulphonates wherein heat is applied in the drying process.

The amount in which the organic base is added is usually between 0.1% and 2% by weight of the sulphonate material. Amounts between 0.1% and 1% are however generally satisfactory and considered preferable. The association of the organic base with the dehydrated oil-soluble sulphonate in amounts according to the limits of this invention does not adversely affect the chemical or physical properties of the sulphonate material so treated.

The addition of the organic bases to the sulphonates according to the invention fulfills a purpose different from that of merely imparting alkalinity to the mass undergoing dehydration. The presence of caustic alkali or sodium carbonate in excess in the purified oil-soluble sulphonates is avoided because of the adverse effects of those compounds upon emulsifying properties. Sodium carbonate in small quantities is usually associated with the sulphonate material undergoing dehydration but is usually consumed by the products of thermal breakdown of the sulphonate during dehydration. It would appear that the addition of organic bases suitable according to the invention, particularly the alkanolamines which have boiling points about 150° C., function during the dehydration of the oil-soluble sulphonates as negative catalysts rather than imparting to any appreciable degree alkalinity to the sulphonate undergoing dehydration. In this regard it is to be noted that the amount of the organic base which is added is appreciably less than that of the sulpho acid component of the sulphonate material.

The use in the process of small quantities of organic bases to inhibit the decomposition during dehydration in the preparation of sulphonates differs from any previous use of organic base materials in the refining of sulphonates. Thus, various type basic compounds have been employed in the prior art to decrease deterioration in the composition of sulphonate materials prepared from cracked petroleum stocks. In these cases the sulphonates prepared are essentially derivatives of green acids, i. e., the water-soluble sulphonates, in which the problem of dehydration is appreciably different from that of dehydrating the oil-soluble sulphonates. In dehydrating sulphonate materials derived from the green acids, the product is obtained in essentially powdered form and the temperatures employed in the dehydration procedures are usually not in excess of 110° C. Basic compounds effective in preventing the decomposition of such water-soluble compounds are those capable of forming water-soluble or readily dispersible compounds with the sulpho acid component of the sulphonate. In the present instance not all oil-soluble organic bases are suitable but only those which have dissociation constants above $3.5 \times 10^{-10}$. It appears to be well established that in the applicants' process the organic bases which are suitable are those which assert a negative catalytic effect upon the decomposition of the oil-soluble sulphonates, since the basic compounds are added in quantities considerably less than that of reacting quantities with the sulpho acid component of the compounds and the amounts of the organic bases which are associated with the dehydrated material do not adversely affect any of the desirable properties of the highly purified sulphonate compounds.

An illustration of the invention is afforded by the use of triethanolamine in the dehydration of oil-soluble sulphonate. This material is prepared by heavily acid-treating a straight-run distillate stock of lubricating oil range. The treated oil is allowed to settle and the sludge layer containing the unreacted acid and water-soluble sulpho compounds separated. The oil is then extracted with approximately an equal volume of 50-50 water-isopropyl alcohol solution containing an excess of sodium carbonate over that required to neutralize the free acidity present. The extracted alcoholic sulphonate solution is then distilled to remove most of the water and the resulting crude sodium sulphonate dissolved in 70% isopropyl alcohol, followed by settling to allow the separation of the inorganic salts. The purified sulphonate solution is then distilled to remove the alcohol and part of the water. The triethanolamine is then added in an amount of 0.5 gallon to 130 gallons of sulphonate. Forty gallons of oil of about 100 vis. Saybolt at 100° F. normal lubricating oil consistency is added in order to render the mixture more fluid and the mixture is heated and then air-blown at 140° C. to bring the moisture to about 1% concentration. The sulphonate material produced in this manner is clear and of transparent, light orange color. On the other hand, when no triethanolamine is added to the soap during its dehydration under the same conditions of treatment the sulphonate material is dark and opaque.

The use of triethanolamine in oil-soluble sulphonates during the drying process is appreciably more important when the processing is effected in the presence of iron. Laboratory data show the inhibiting effect of the triethanolamine in the presence of iron.

| Finishing method | Lovibond colors of sulphonate 10% solution in 1" cell | |
|---|---|---|
| | Sample #1 | Sample #2 |
| Dried in glass | Y22 R3.6 | Y21 R3.5 |
| Dried in presence of iron | Y24.5 R4.2 | Y23.5 R4.0 |
| Dried in presence of iron+0.1% triethanolamine | Y23.7 R4.0 | Y21 R3.6 |

In this tabulation the lower the numerical values for the yellow discs (Y) and the red discs (R) the better is the color of the sulphonate material.

The purified sulphonates prepared according to this invention can be advantageously employed as emulsifying agents and as constituents in textile oils. In general the oil-soluble sulphonates are employed for these uses because of the outstanding properties as surface active agents when incorporated in aqueous and oil solutions. Impure sulphonates, however, stain and decrease the life of the textile fibers and affect adversely the dyeing characteristics. The advantage of using blended compositions to soften and lubricate textile fibers as a means of preventing irregularities in the spinning, weaving and knitting operations or decreasing friction and preventing matting, felting and interlocking of the fibers is negated when the fibers are so adversely affected by the deterioration products of the oil composition. Also the deterioration products are more difficult to remove from the fibers after the fabricating operations than the oil itself, and thus there often occurs as a consequence an unevenness in the subsequent bleaching and dyeing operations. The method of the present invention is particularly suitable for preparing oil-soluble sulphonates of satisfactory quality for incorporation in textile lubricants. Also another use of the sulphonates prepared according to this invention which is an indication of their high quality is that of emulsifying agents for the preparation of high grade oil in water emulsions. Thus, when 10% of the sulphonates prepared according to this invention are dissolved in a mineral white oil of 100 Saybolt viscosity at 100° F. and the mixture shaken with 10 volumes of water, a good emulsion is formed.

The above description of the invention is not to be considered as limiting the invention and the examples given are presented merely for purposes of illustration. Many variations may be made by those skilled in the art. Such variations are within the scope and spirit of the invention. The only limitation of the invention is that given in the following claims.

What is claimed is:

1. An improved purification procedure in the refining of alkali metal oil-soluble sulphonates produced from straight-run petroleum distillates which comprises dissolving the crude alkali metal oil-soluble sulphonates in a suitable solvent-containing water, separating the inorganic materials thus precipitated, removing the solvent and part of the water, then adding to the solution between 0.1% and 2% by weight of an oil-soluble base having a dissociation constant above $3.5 \times 10^{-10}$, heating the resultant solution to remove substantially all the water-solvent and collecting the sulphonates.

2. An improved procedure according to claim 1 in which the solvent-containing water is an aqueous isopropyl alcohol solution of not less than 60% alcohol.

3. An improved procedure according to claim 1 in which the oil-soluble base is triethanolamine.

4. The process of obtaining highly stable purified oil-soluble sulphonates which comprises intensively treating a petroleum distillate of about lubricating oil range with sulphuric acid at a temperature between 20° C. and 75° C., allowing the reaction mixture to stratify, separating the lower sludge layer containing unreacted acid and water-soluble sulpho compounds, treating the oil with about an equal volume of a 50-50 water-isopropyl alcohol solution containing an excess of sodium carbonate to neutralize the acidity of the oil, distilling the resultant iso-propyl alcohol solution to remove substantially all the water, dissolving the distillation residue in 70% isopropyl alcohol, allowing the solution to settle, separating the inorganic materials thus precipitated, removing the solvent and the part of the water, then adding to the solution between 0.1% and 2% by weight of said sulphonate of an oil-soluble base having a dissociation constant above $3.5 \times 10^{-10}$, heating the resultant solution to remove substantially all the water and collecting the sulphonates.

5. Process according to claim 4 in which the oil-soluble base is triethanolamine.

6. In the process of manufacturing substantially dry purified alkali metal petroleum oil-soluble sulphonates wherein heat is applied in the drying process, the step of preventing decomposition by adding thereto an alkanolamine in concentrations between about 2% and 0.1% by weight of the sulphonate.

7. In the process of manufacturing substantially purified alkali metal petroleum oil-soluble sulphonates wherein heat is applied in the drying process, the step of preventing decomposition by adding thereto an alkanolamine having a dissociation constant above $3.5 \times 10^{-10}$ and boiling above about 150° C. in concentration between 0.1% and 2% by weight of the sulphonate.

8. An alkali metal petroleum oil-soluble composition of matter suitable for use as an emulsifying agent in the preparation of water in oil emulsions and as a constituent in textile lubricants and of good color and odor, which consists essentially of a substantially dry purified oil-soluble sulphonate and an alkanolamine in a concentration between 0.1% and 2% by weight of the sulphonate.

9. An alkali metal petroleum oil-soluble composition of matter according to claim 6 in which the alkanolamine is triethanolamine.

10. An alkali metal petroleum oil-soluble sulphonate material resistant to deterioration and color degradation when heated in the presence of moisture at a temperature between 130° C. and 160° C. which consists essentially of an oil-soluble sulphonate to which is added during the drying process wherein the sulphonate is heated to a temperature between 130° C. and 160° C. an alkanolamine in a concentration between 0.1% and 2% by weight of the sulphonate.

11. An alkali metal petroleum oil-soluble sulphonate material according to claim 10 in which the alkanolamine is triethanolamine.

12. The process of overcoming the thermal instability of alkali metal oil-soluble petroleum sulphonates resulting particularly from processing in iron-containing equipment which comprises adding in the final purification stage of said alkali metal oil-soluble sulphonate an alkanolamine having a dissociation constant above $3.5 \times 10^{-10}$ and boiling point above about 150° C. in concentration between 0.1% and 2% by weight of the alkali metal sulphonate, and heating the resultant mixture to remove substantially any water present.

13. The process according to claim 12 in which the alkanolamine is triethanolamine.

FRANCIS M. ARCHIBALD.
DICK van DIJK.